United States Patent [19]
Zander

[11] Patent Number: 5,534,962
[45] Date of Patent: Jul. 9, 1996

[54] METHOD AND APPARATUS FOR PREVENTING UNAUTHORIZED RECYCLING OF SINGLE-USE CAMERA AND PERMITTING AUTHORIZED REUSE OF THE CAMERA

[75] Inventor: Dennis R. Zander, Penfield, N.Y.

[73] Assignee: Eastman Kodak Company, Rochester, N.Y.

[21] Appl. No.: 369,960

[22] Filed: Jan. 9, 1995

[51] Int. Cl.⁶ .................................................. G03B 17/00
[52] U.S. Cl. ...................................................... 354/289.12
[58] Field of Search ........................... 354/289.1, 289.11, 354/289.12, 131

[56] References Cited

U.S. PATENT DOCUMENTS 4,230,400  10/1980  Wick et al. ................................. 354/25
4,509,093   4/1985  Stellberger .............................. 361/172
4,904,993   2/1990  Sato ...................................... 340/825.57
4,959,676   9/1990  Matsuda et al. ......................... 354/400

*Primary Examiner*—David M. Gray
*Attorney, Agent, or Firm*—Roger A. Fields

[57] ABSTRACT

When an exposure counter in a single-use camera indicates that the maximum number of exposures on a roll of film in the camera have been exposed, a function of the camera such as an electronic flash capability is disabled to prevent unauthorized recycling of the camera. A reset code must be inputted to the camera to initialize the exposure counter and to enable the electronic flash capability, to permit authorized reuse of the camera with another roll of film.

12 Claims, 5 Drawing Sheets

5,534,962

METHOD AND APPARATUS FOR PREVENTING UNAUTHORIZED RECYCLING OF SINGLE-USE CAMERA AND PERMITTING AUTHORIZED REUSE OF THE CAMERA

CROSS-REFERENCED TO RELATED APPLICATIONS

Reference is made to commonly assigned copending application Ser. No. 08/210,983, entitled METHOD AND APPARATUS FOR PREVENTING UNAUTHORIZED RECYCLING OF SINGLE-USE CAMERA AND PERMITTING AUTHORIZED REUSE OF THE CAMERA, and filed Mar. 21, 1994 in the name Dwight J. Petruchick and Clay A. Dunsmore.

FIELD OF THE INVENTION

The invention relates generally to the field of photography, and in particular to single-use cameras. More specifically, the invention relates to a method and apparatus for preventing unauthorized recycling of a single-use camera after a roll of film in the camera is completely exposed and for permitting authorized reuse of the camera when the roll of film is replaced with another one.

BACKGROUND OF THE INVENTION

Film and cameras that are all in one, commonly referred to as single-use cameras, have recently become well known. Typically, the single-use camera is a simple point-and-shoot type comprising a plastic main body portion which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder tunnel, and possibly an electronic flash unit. Front and rear plastic casing or cover portions house the main body portion between them to form a light-tight camera unit. A decorative cardboard outer box contains the camera unit and has respective openings for the taking lens, the shutter release button, the film advance thumbwheel, the viewfinder tunnel, the frame counter, and a flash emission window.

At the manufacturer, the main body portion is loaded with a conventional 12, 24, or 36 exposure 35 mm film cartridge and the front and rear casing portions are connected to each other and/or to the main body portion to assemble the light-tight camera unit. Then, an exposed end of a supply spool in the main body portion is rotated to factory prewind substantially the entire length of the unexposed filmstrip from the cartridge onto the supply spool. Lastly, the outer box is placed on the camera unit.

After the photographer takes a picture using the single-use camera, he or she manually rotates the thumbwheel in engagement with a take-up spool inside the cartridge to rewind the exposed frame into the cartridge. The rewinding movement of the filmstrip the equivalent of slightly more than one frame width rotates a metering sprocket in engagement with the filmstrip to decrement the frame counter to its next lower-numbered setting. When the maximum number of exposures available on the filmstrip are exposed and the filmstrip is completely rewound into the cartridge, the single-use camera is given to a photofinisher who tears the outer box off the camera unit, separates the rear cover portion from the main body portion, and removes the cartridge with the filmstrip from the main body portion. Then, he removes the filmstrip from the cartridge to develop the negatives and make prints for the customer, and he forwards the used camera parts to the manufacturer for recycling, i.e. remanufacture.

During recycling, the main body portion is re-loaded with a film cassette containing fresh film, and the front and rear casing portions are re-connected to each other and/or to the main body portion. Then, the exposed end of the supply spool in the main body portion is again rotated to factory prewind substantially the entire length of the unexposed filmstrip from the cartridge onto the supply spool. Lastly, a new outer box is placed on the camera unit.

There is a need recognized in the industry to prevent unauthorized recycling of single-use cameras in order to maintain camera quality. Unauthorized recycled cameras may be of lesser quality than authorized recycled cameras.

THE CROSS-REFERENCED APPLICATION

The cross-referenced application discloses a method of preventing unauthorized recycling of a single-use camera but permitting authorized reuse of the camera. According to the method, it is first determined that the maximum number of exposures on a roll of film in the camera is exposed. Then, a function of the camera such as electronic flash capability is disabled to prevent unauthorized reuse of the camera with a roll of fresh film. To permit authorized reuse of the camera with the roll of fresh film, a predetermined unique reset code must be inputted to the camera. The reset code re-enables the function that has been disabled.

SUMMARY OF THE INVENTION

According to one aspect of the invention, a method of preventing unauthorized recycling of a single-use camera but permitting authorized reuse of the camera, comprising the steps of first determining that a particular event in the camera has occurred, then disabling a function of the camera to prevent unauthorized reuse of the camera, and then inputting a predetermined unique reset code to the camera to reenable the function that has been disabled to permit authorized reuse of the camera, is characterized in that:

the reset code is inputted to the camera by positioning a separate code inputting device within sensing range of a built-in sensor device of the camera which otherwise serves a conventional sensing function for ordinary operation of the camera.

According to another aspect of the invention, a single-use camera comprising means for determining that completed use of the camera has occurred, means for disabling a function of the camera to prevent unauthorized reuse of the camera when completed use of the camera has occurred, and means for receiving a predetermined unique reset code from a separate code inputting device to re-enable the function that has been disabled to permit authorized reuse of the camera, is characterized in that:

the means for receiving the reset code from the code inputting device includes an exterior sensor device which receives the reset code and otherwise serves a conventional sensing function for ordinary operation of the camera.

DETAILED DESCRIPTION OF THE INVENTION

The invention is disclosed as being embodied preferably in a single-use 35 mm camera having a built-in electronic flash unit. Because the features of such a camera are generally known, the description which follows is directed in particular only to those elements forming part of or cooperating directly with the disclosed embodiment. It is to be understood, however, that other elements may take various forms known to a person of ordinary skill in the art.

Figure 1:
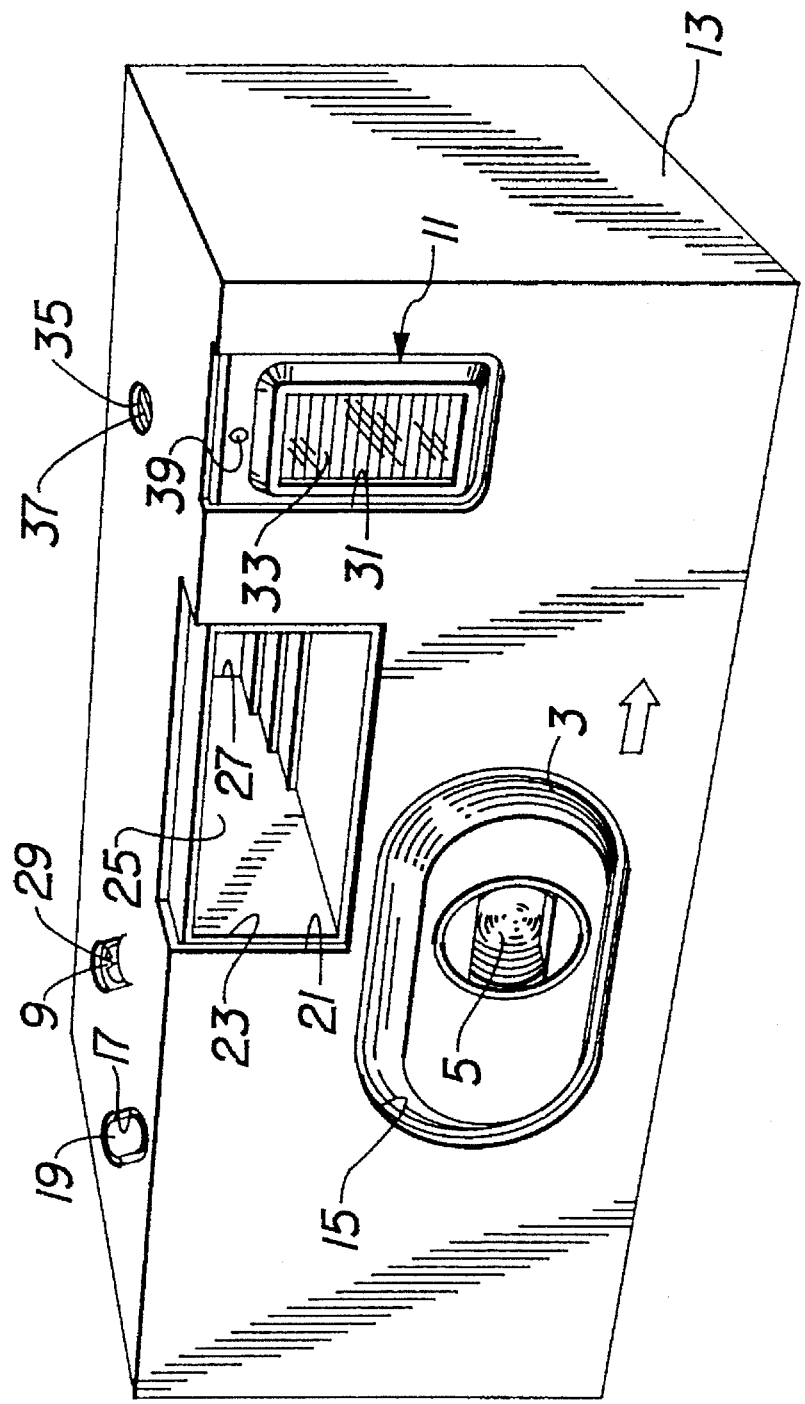
FIG. 1 is a front perspective view of a single-use camera with a built-in electronic flash unit.
Figure 2:
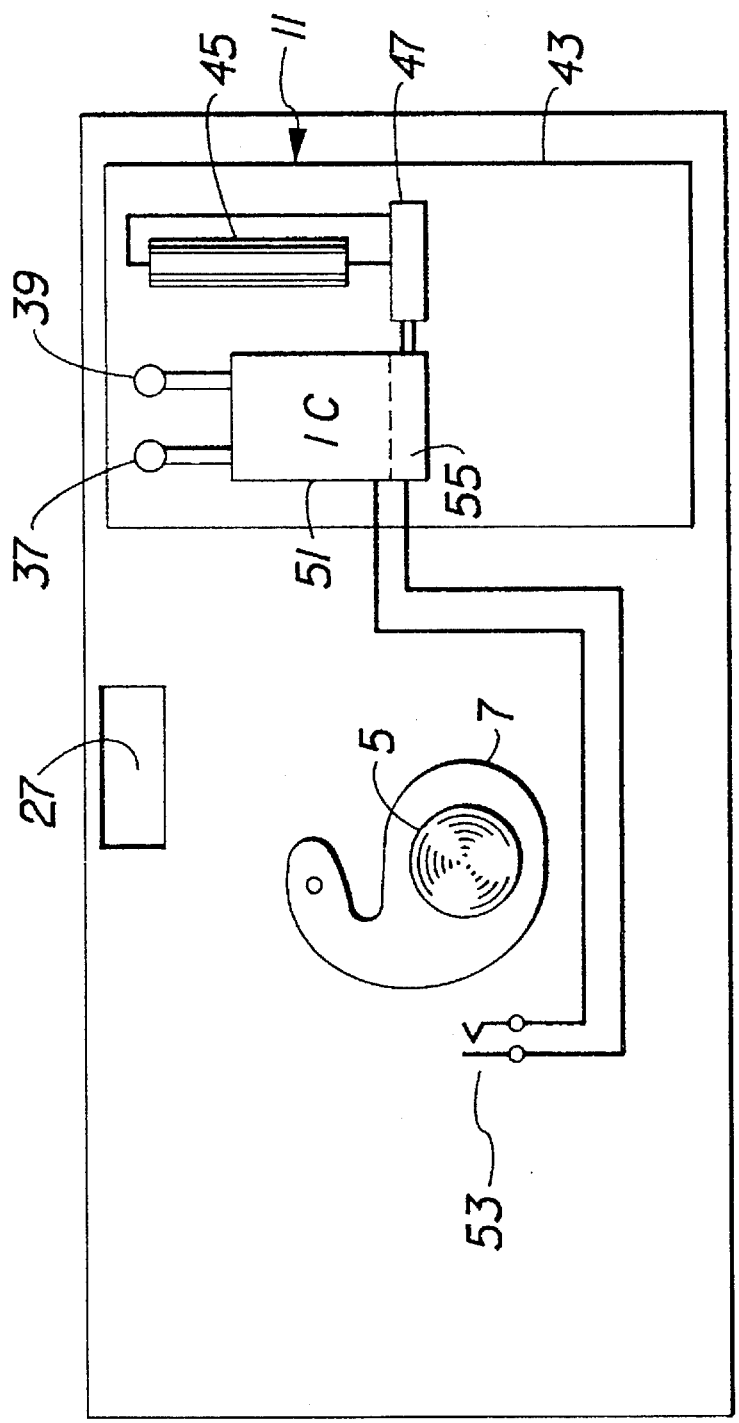
FIG. 2 is a front elevation view of the camera as seen from the inside to show various components that comprise a preferred embodiment of the invention.

Referring now to the drawings, FIGS. 1 and 2 show a single-use camera 1 which comprises a plastic light-tight camera unit 3 housing a known fixed-focus taking lens 5, a known film metering mechanism, not show, a known single-blade shutter 7, a known frame counter 9 for visibly indicating the number of exposures remaining for picture-taking, and an electronic flash unit 11. A cardboard outer cover or casing 13 contains the camera unit 3 and has a front opening 15 for the taking lens 5, a top opening 17 for a manual shutter release button 19, a rear opening for a manual film advance thumbwheel, not shown, a front opening 21 for a front viewfinder window 23 of a direct see-through viewfinder 25, a rear opening, not shown, for a rear viewfinder window 27, a top opening 29 for the frame counter, a front opening 31 for a flash emission window 33, and a top opening 35 for a flash-ready light emitting diode (LED) 37. A known ambient light sensor 39 for operation of the electronic flash unit 11 is located in the front opening 31 above the flash emission window 33. The ambient light sensor 39 provides a brightness measure of the ambient light to determine whether a flash or daylight exposure is in order.

The flash unit 11 as shown in FIG. 2 includes a flash circuit board 43 on which is mounted a known flash tube 45 located behind the flash emission window 33, a known flash charger circuit 47 for storing a suitable voltage to ignite the flash tube to provide flash illumination, and an integrated control circuit (IC) 51. The IC 51 is connected to the LED 37, the ambient light sensor 39, and a normally open shutter-flash synch switch 53 which is closed every time the shutter blade 7 is pivoted clockwise in FIG. 2 to momentarily uncover the taking lens 5 to take a picture.

At the manufacturer, the camera unit 3 is loaded with a conventional 12, 24, or 36 exposure 35 mm film cartridge and substantially the entire length of the unexposed filmstrip is factory prewound from the cartridge onto a spool, not shown, in the camera unit. Also, the frame counter 9 is set to the maximum number of exposures available on the unexposed filmstrip. After the photographer takes a picture, he or she manually rotates the thumbwheel to rewind the exposed frame into the cartridge. The rewinding movement of the filmstrip the equivalent of slightly more than one frame width rotates a metering sprocket, not shown, to decrement the frame counter 9 to its next lower numbered setting, e.g. from "36" to "35". Further details of this operation are disclosed in commonly assigned U.S. Pat. No. 5,235,366, issued Aug. 10, 1993. When the maximum number of exposures available on the filmstrip are exposed and the filmstrip is completely rewound into the cartridge, the single-use camera 1 is given to a photofinisher who first removes the filmstrip from the camera unit 3 to develop the negatives and then forwards the camera unit to the manufacturer for recycling. The manufacturer, in turn, recycles the camera unit 3 by loading it with another roll of film and repeating the foregoing prewinding process.

Figure 3:
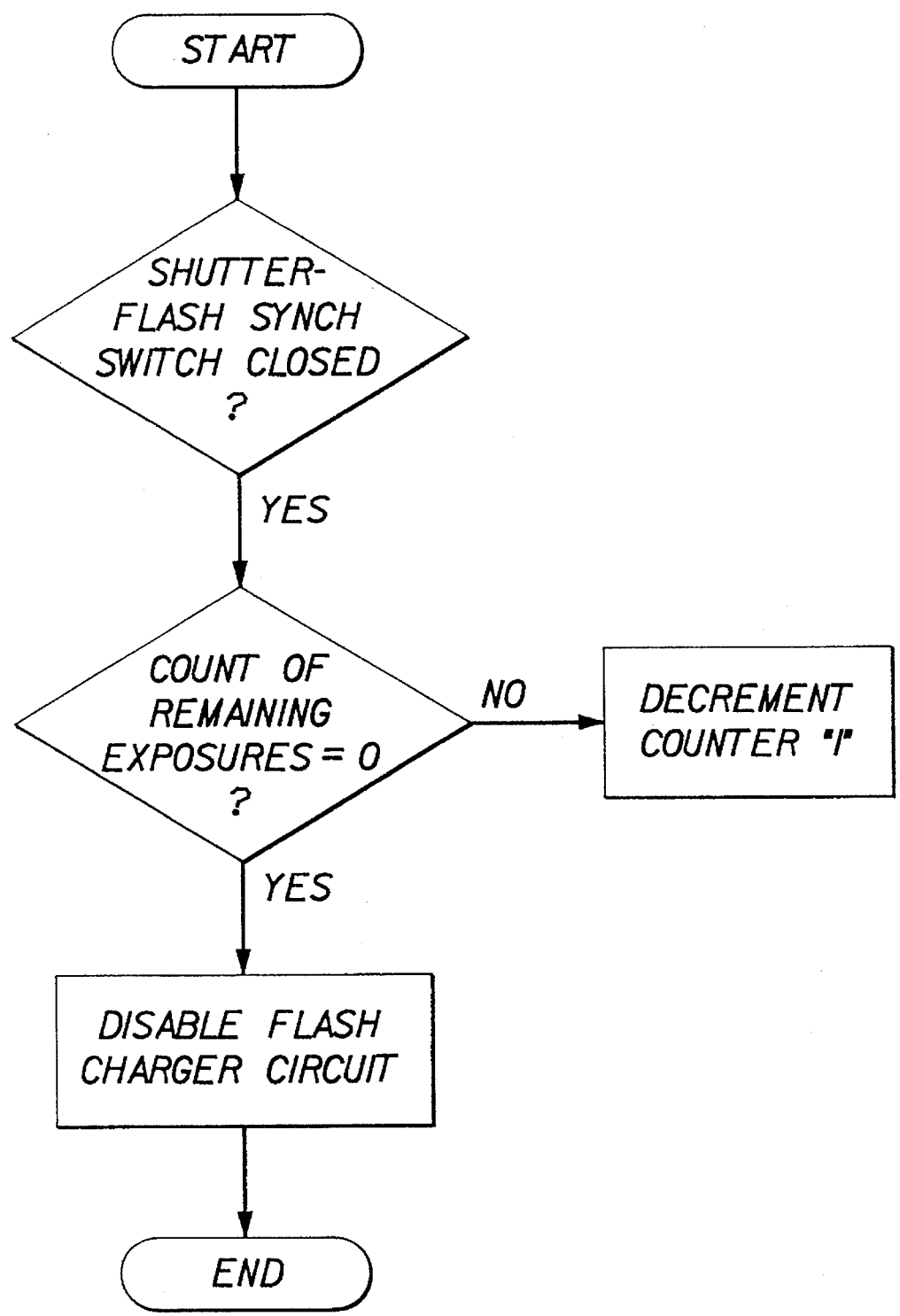
FIG. 3 is a a flow chart.

The IC 51 includes a known count-down counter 55 which when initialized is set to the maximum number of exposures available on a roll of film in the camera unit 3 (similar to the frame counter 9). The counter 55 is adapted to be decremented by "1" when the shutter-flash synch switch 53 is closed by the shutter blade 7 to take a picture, to provide a count of the number of exposures remaining to be made on the roll of film. As shown in FIG. 3, each time the shutter-flash synch switch 53 is closed, the IC 51 interrogates the counter 55 to determine whether its count is at least "1". If the count is at least "1" the counter 55 is decremented by "1". Conversely, if the counter is "0" the flash charger circuit 47 is disabled.

Figure 4:
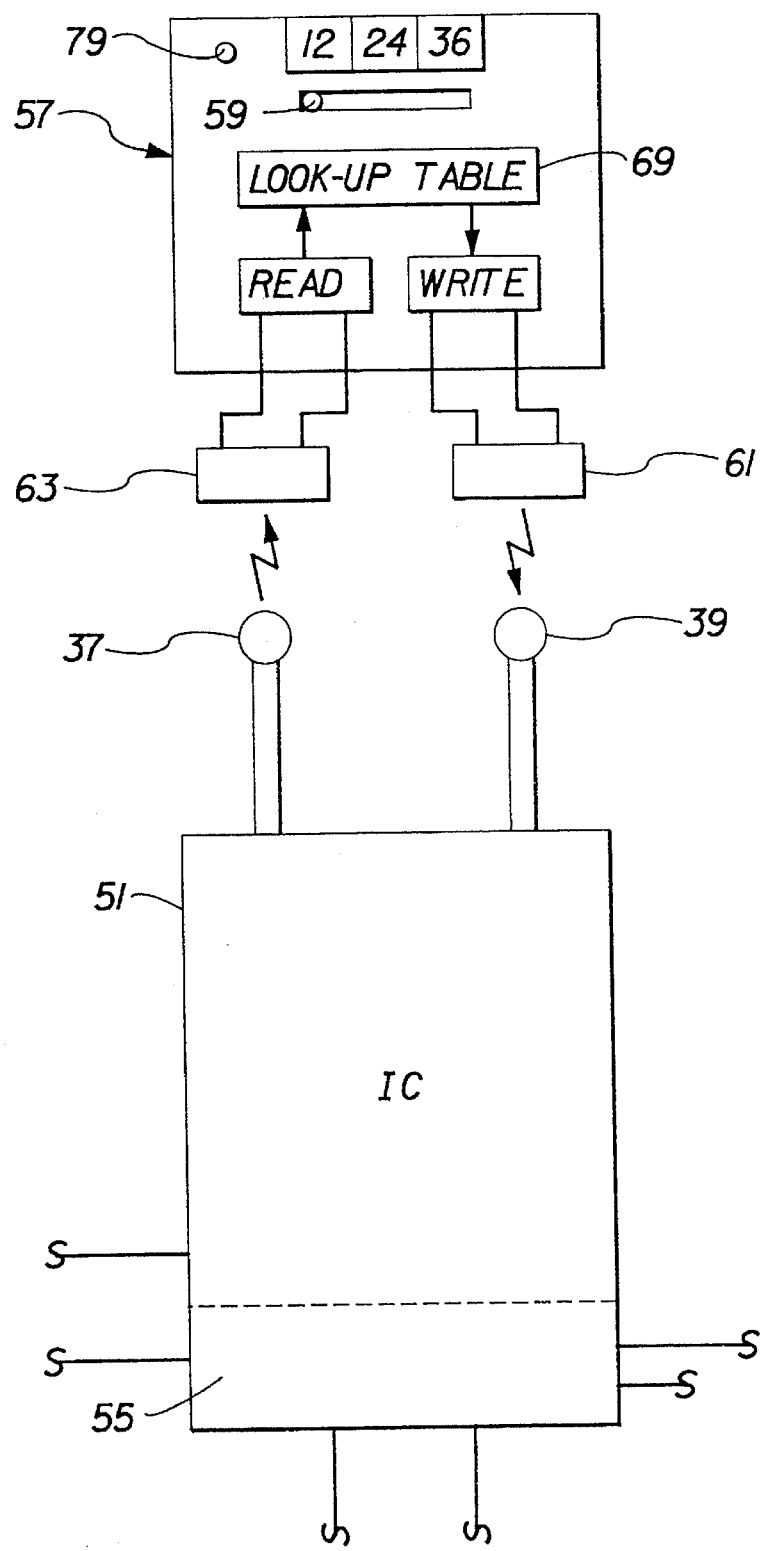
FIG. 4 is a schematic view of other components of the preferred embodiment.
Figure 5:
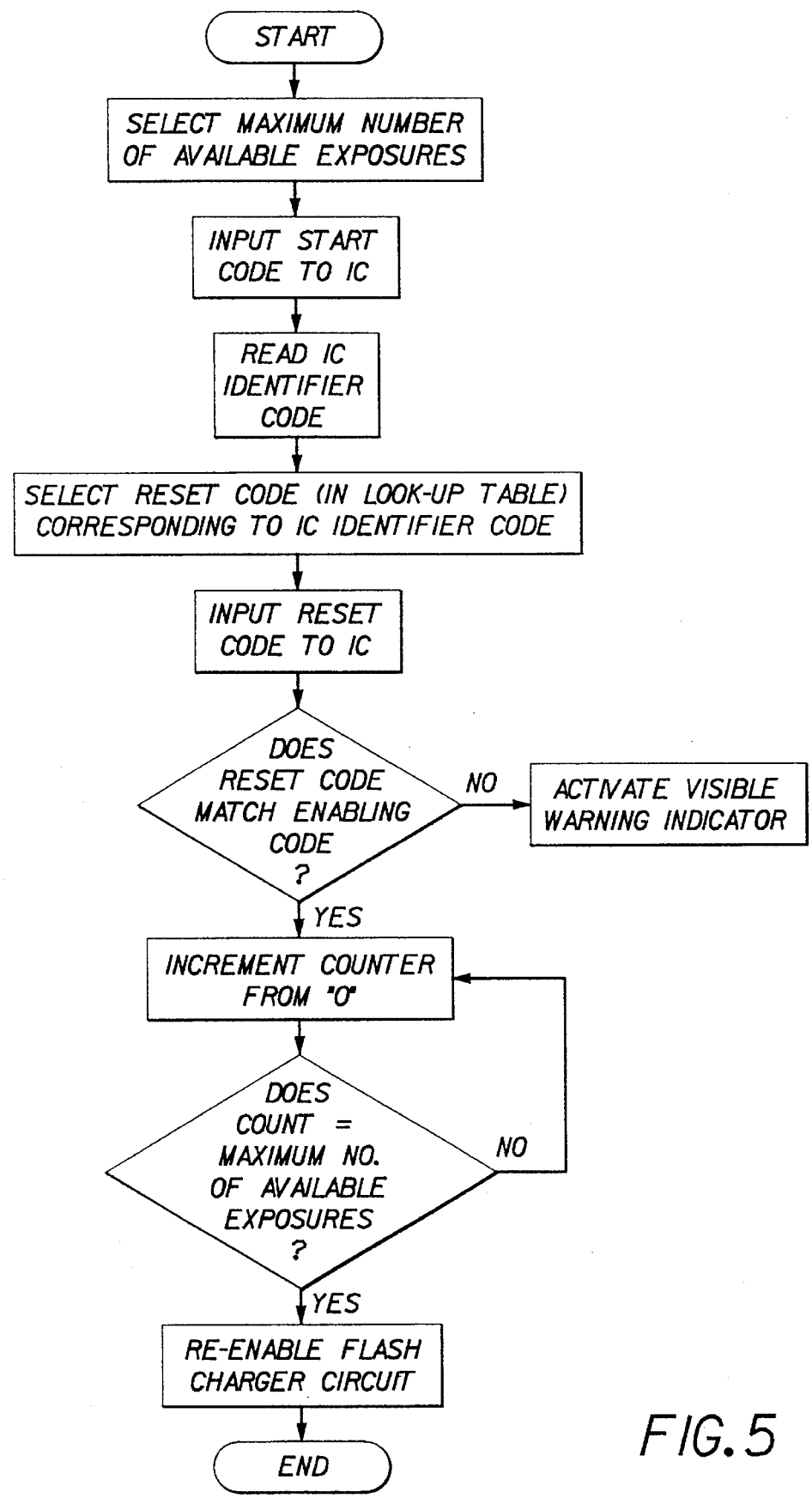
FIG. 5 is a flow chart.

When the flash charger circuit 47 is disabled, the camera unit 3 cannot be effectively recycled unless authorized. According to the invention, there is provided a method of permitting authorized recycling of the camera unit 3. This method is depicted in FIG. 5 and comprises the following steps:

(1) The maximum number of exposures available on a fresh roll of film loaded or to be loaded in the camera unit 3 is selected on a code inputting device 57 by manually sliding a pointer 59 to the selected number "12", "24", or "36". The code inputting device 57 is shown in FIG. 4.

(2) A code-source light emitting diode (LED) 61 of the code inputting device 57 is positioned opposite the ambient light sensor 39 to first input a start code to the IC 51 via the ambient light sensor, to cause the IC to then output an identifier code via the flash-ready LED 37 and to later accept a reset code via the ambient light sensor. The start code is a plurality of light pulses each having a different duration.

(3) A phototransistor 63 of the code inputting device 57 is positioned opposite the flash-ready LED 37 to permit the code inputting device to read the identifier code provided by the IC 51. Preferably, the identifier code is unique to the IC 51 to make it more difficult to decipher that code and is a plurality of light pulses each having a different duration.

(4) The code inputting device 57 includes a look-up table 69 having a plurality of identifier codes (for various IC's), one of which is the identifier code that has been read in step 3, and a plurality of reset codes that correspond 1:1 to the identifier codes, and is adapted via a central processing unit (CPU), not shown, to select the reset code that corresponds to the identifier code that has been read in step 3. Also, the plurality of reset codes correspond 1:1 to various enablement codes (provided in respective IC's), one of which is provided in the IC 51 for instructing that IC to trigger initializing the counter 55 and re-enabling the flash charger circuit 47.

(5) The code-source LED 61 of the code inputting device 57 then inputs the reset code, which has been selected in step 4, via the ambient light sensor 39 to the IC 51. The reset code is a plurality of light pulses each having a different duration.

Presumably, the reset code that is inputted via the ambient light sensor 39 to the IC 51 will match the enablement code of that IC. As a result, the counter 55 will be incremented from "0" to the number of exposures selected in step 1 and the flash charger circuit 49 will be re enabled. If the reset code that is inputted to the IC 51 does not match the enablement code of that IC for some reason, a visible warning indicator 79 on the reader 57 is activated.

The term "code" or "codes" as used in regard to the start code, the identifier code, the reset code, and the enablement code is intended to be given the common ordinary meaning, i.e. a system of signals or symbols for communication used to represent assigned and often secret meanings, such as in the case of the Morse code and the binary and other machine languages used in digital computers. The various codes, although preferably optical, can be a number of other different types, e.g. electrical or magnetic, digital or analog.

The invention has been described with reference to a preferred embodiment. However, it will be appreciated that variations and modifications can be effected by a person of ordinary skill in the art without departing from the scope of the invention. For example, instead of disabling the flash charger circuit 49 to prevent the flash function of the camera unit 3, anyone of several other known functions or operations of the camera unit such as shutter operation or film advance operation can be disabled. In this sense, the terms "functions" and "operations" are intended to be equivalents. Also, instead of counting the number of closures of the shutter-flash synch switch 53 for the purpose of disabling a function of the camera unit 3, various other events may be used to determine when to disable a function of the camera unit. For instance, a function of the camera unit 3 can be disabled in response to removing an exposed roll of film from the camera unit, in response to removing a battery from the camera unit, or in response to opening the camera unit to remove the exposed roll of film.

As suggested in commonly assigned U.S. Pat. No. 5,021,811, issued Jun. 4, 1991, the flash circuit board 43 can include means for visibly indicating the number of times the camera unit 3 has been recycled.

PARTS LIST FOR FIGS. 1–5

1. single-use camera
3. light-tight camera unit
5. taking lens
7. shutter blade
9. frame counter
11. flash unit
13. outer cover
15. front opening
17. top opening
19. shutter release button
21. front opening
23. front viewfinder window
25. see-through viewfinder
27. rear viewfinder window
29. top opening
31. front opening
33. flash emission window
35. top opening
37. flash-ready LED
39. ambient light sensor
43. flash circuit board
45. flash tube
47. flash charger circuit
51. IC
53. flash-shutter synch switch
55. counter
57. code inputting device
59. pointer
61. code-source LED
63. phototransistor
69. look-up table
79. warning indicator

What is claimed is:

1. A method of preventing unauthorized recycling of a single-use camera but permitting authorized reuse of the camera, comprising the steps of first determining that a particular event in the camera has occurred, then disabling a function of the camera to prevent unauthorized reuse of the camera, and then inputting a predetermined unique reset code to the camera to re-enable the function that has been disabled to permit authorized reuse of the camera, is characterized in that:

the reset code is inputted to the camera by positioning a separate code inputting device within sensing range of a built-in sensor device of the camera which otherwise serves a conventional sensing function for ordinary operation of the camera.

2. A method as recited in claim 1, wherein the sensor device is an ambient light sensor used for exposure control of the camera, and the code inputting device inputs the reset code to the camera by emitting a plurality of light pulses within sensing range of the ambient light sensor.

3. A method as recited in claim 1, wherein the code inputting device initially inputs a start code to the camera via the sensor device to cause the camera to accept the reset code, and the code inputting device then inputs the reset code to the camera via the sensor device.

4. A method as recited in claim 1, wherein the code inputting device initially inputs a start code to the camera via the sensor device to cause a built-in code output device of the camera to input an identifier code to the code inputting device, and the code inputting device then selects the reset code to be one that matches the identifier code.

5. A method as recited in claim 1, wherein the code inputting device inputs a start code to the camera via the sensor device before it inputs the reset code to the camera via the sensor device, a built-in indicator device of the camera for otherwise indicating a particular condition of the camera relevant to the sensing function of the sensor device outputs an identifier code to the code inputting device in response to input of the start code to the camera, and the code inputting device then selects the reset code to be one that corresponds only to the identifier code.

6. A method as recited in claim 5, wherein the sensor device is an ambient light sensor used for exposure control of the camera, the code inputting device inputs the reset code to the camera by emitting at least one light pulse of a predetermined duration within sensing range of the ambient light sensor, and the indicator device is a light emitting diode which continuously emits light to indicate the particular condition of the camera and emits at least one light pulse of a predetermined duration to output the identifier code to the code inputting device.

7. A method as recited in claim 1, wherein a built-in indicator device of the camera for otherwise indicating a particular condition of the camera relevant to the sensing function of the sensor device outputs an identifier code to the code inputting device to permit the code inputting device to input the reset code to the camera.

8. A method of preventing unauthorized recycling of a single-use camera but permitting authorized reuse of the camera, comprising the steps of first determining that completed use of the camera has occurred, then disabling an electronic flash unit of the camera to prevent unauthorized reuse of the camera, and then inputting a predetermined unique reset code to the camera to re-enable the electronic flash unit to permit authorized reuse of the camera, is characterized in that:

the reset code is inputted to the camera by positioning a separate code inputting device within sensing range of a built-in ambient light sensor of the camera which otherwise serves a light sensing function for operation of the electronic flash unit.

9. A single-use camera comprising means for determining that completed use of the camera has occurred, means for disabling a function of the camera to prevent unauthorized reuse of the camera when completed use of the camera has occurred, and means for receiving a predetermined unique reset code from a separate code inputting device to re-enable the function that has been disabled to permit authorized reuse of the camera, is characterized in that:

said means for receiving the reset code from the code inputting device includes an exterior sensor device which receives the reset code and otherwise serves a conventional sensing function for ordinary operation of the camera.

10. A single-use camera as recited in claim 9, wherein said sensor device is an ambient light sensor for receiving the reset code from the code inputting device and otherwise is used for exposure control of the camera.

11. A single-use camera as recited in claim 9, wherein said means for disabling a function of the camera is adapted to disable an electronic flash unit of the camera, and said sensor device is an ambient light sensor for receiving the reset code from the code inputting device and otherwise serves a light sensing function for operation of said electronic flash unit.

12. A single-use camera comprising means for determining that completed use of the camera has occurred, means for disabling a function of the camera to prevent unauthorized reuse of the camera when completed use of the camera has occurred, and means for receiving an optical reset code from a separate code inputting device to re-enable the function that has been disabled to permit authorized reuse of the camera, is characterized in that:

said means for receiving the optical reset code from the code inputting device includes an optical sensor which receives the optical reset code from the code inputting device and otherwise serves a conventional optical sensing function for ordinary operation of the camera.

* * * * *